United States Patent [19]

Okamoto

[11] Patent Number: 5,723,228
[45] Date of Patent: Mar. 3, 1998

[54] DIRECT METHANOL TYPE FUEL CELL

[75] Inventor: Takafumi Okamoto, Wako, Japan

[73] Assignee: Honda Giken Kogyo Kabushiki Kaisha, Tokyo, Japan

[21] Appl. No.: 764,072

[22] Filed: Dec. 6, 1996

[30] Foreign Application Priority Data

Dec. 6, 1995 [JP] Japan ................. 7-318288
Dec. 6, 1995 [JP] Japan ................. 7-318296

[51] Int. Cl.$^6$ .................................. H01M 8/04
[52] U.S. Cl. ....................... 429/12; 429/26; 429/34
[58] Field of Search ................... 429/12, 34, 17, 429/26, 19

[56] References Cited

U.S. PATENT DOCUMENTS

| | | | |
|---|---|---|---|
| 4,493,878 | 1/1985 | Horiba et al. | 429/12 |
| 4,659,634 | 4/1987 | Struthers | 429/19 |
| 4,769,296 | 9/1988 | Sterzel | 429/12 |

FOREIGN PATENT DOCUMENTS

| | | |
|---|---|---|
| 155695 | 9/1985 | European Pat. Off. . |
| 575178 | 12/1993 | European Pat. Off. . |
| 50866 | 3/1985 | Japan . |
| 279069 | 12/1986 | Japan . |
| 141265 | 6/1988 | Japan . |
| 3965 | 1/1989 | Japan . |
| 154467 | 6/1989 | Japan . |
| 154468 | 6/1989 | Japan . |
| 281567 | 11/1990 | Japan . |
| 159790 | 6/1993 | Japan . |
| 5-174856 | 7/1993 | Japan . |
| WO96/37920 | 11/1996 | WIPO . |

*Primary Examiner*—Anthony Skapars
*Attorney, Agent, or Firm*—Birch, Stewart, Kolasch & Birch, LLP

[57] ABSTRACT

A direct methanol type fuel cell comprises at least one fuel cell unit including an anode and a cathode and a plurality of separators. Each of the separators comprises an aqueous methanol solution flow-adjusting plate having grooves formed in parallel to a direction of gravity, and an oxygen containing gas flow-adjusting plate having grooves formed. A methanol tank and a water tank are connected to a supply passage through pumps respectively. The supply passage communicates through a passage to the aqueous methanol solution flow-adjusting plate. The aqueous methanol solution flow-adjusting plate is formed of a porous conductive material. Therefore, the aqueous methanol solution can be stably supplied at a uniform concentration to the entire operating surface of the anode.

16 Claims, 17 Drawing Sheets

DIRECT METHANOL TYPE FUEL CELL

BACKGROUND OF THE INVENTION

1. Field of the Invention

The present invention relates to a direct methanol type fuel cell comprising at least one fuel cell unit including an anode and a cathode provided opposingly with an ion exchange membrane interposed therebetween, and a plurality of separators for interposing the fuel cell unit therebetween so that an aqueous methanol solution as fuel is directly supplied to the fuel cell.

2. Description of the Related Art

There have been developed fuel cells comprising, for example, a plurality of stacked fuel cell units each having an anode and a cathode provided opposingly with an ion exchange membrane sandwiched therebetween, the fuel cell units being interposed between separators. Such fuel cells are being put to practical use in a variety of applications.

Those known as such fuel cells include a direct methanol type fuel cell in which an aqueous methanol solution is directly supplied in a liquid state to an anode, and oxygen containing gas (air) is supplied to a cathode so that the aqueous methanol solution reacts with water to obtain hydrogen ion, and movement of the hydrogen ion through an ion exchange membrane makes it possible to produce electric energy available out of the fuel cell.

The direct methanol type fuel cell has a system, for example, as disclosed in Japanese Patent Laid-open No. 5-174856. Such a system will be explained with reference to FIG. 1. A methanol electrode 2 and an air electrode 3 are arranged on both sides of a methanol impermeable membrane 1, and an electrolyte solution 4 is charged between them so that a direct methanol type fuel cell is constructed. In this system, electric power is generated by supplying an aqueous methanol solution to the methanol electrode 2, while supplying air (oxygen) to the air electrode 3.

However, in the conventional technique described above, the aqueous methanol solution as fuel and the air as oxygen containing gas are allowed to flow in an identical direction with respect to the methanol electrode 2 and the air electrode 3. Therefore, an outlet side 5b in the fuel cell, concerning the aqueous methanol solution and the air, has a temperature higher than a temperature of an inlet side 5a, because of the following reason. Namely, the heat generated by exothermic reactions on the methanol electrode 2 and the air electrode 3, and the heat caused by contact resistance or the like are subjected to heat exchange with the aqueous methanol solution and the gas flowing from the inlet side 5a to the outlet side 5b, and the methanol electrode 2 and the air electrode 3 themselves are most excessively heated on the outlet side 5b. A problem is pointed out in that the situation as described above causes a distribution in voltage obtained by the methanol electrode 2 and the air electrode 3, resulting in an unstable output voltage.

SUMMARY OF THE INVENTION

A general object of the present invention is to provide a direct methanol type fuel cell which makes it possible to reliably obtain a stable output voltage without causing any ununiform temperature distribution in any fuel cell unit.

A principal object of the present invention is to provide a direct methanol type fuel cell which has a simple system and makes it possible to reliably supply a proper amount of an aqueous methanol solution to an entire surface of an anode.

According to one aspect of the present invention, an aqueous methanol solution is directly supplied along an aqueous methanol solution-supplying fluid passage which is formed in parallel to a direction of gravity on an anode-side elemental member, while oxygen containing gas is supplied along an oxygen containing gas supplying fluid passage which is formed on a cathode-side elemental member and directed to a direction opposite to a direction to which the methanol-supplying fluid passage is directed. Accordingly, the aqueous methanol solution as fuel flows through a fuel cell unit in the direction opposite to the direction in which the oxygen containing gas flows. Therefore, it is possible to minimize the ununiform temperature distribution in the fuel cell unit as less as possible. Thus, it is possible to obtain a stable output voltage from the fuel cell unit.

The aqueous methanol solution is allowed to flow directly in a direction opposite to gravity along the aqueous methanol solution-supplying passage. Accordingly, carbon dioxide gas, which is produced upon reaction of methanol and water, is smoothly discharged upwardly.

The oxygen containing gas supplying fluid passage, which is formed in parallel to the aqueous methanol solution-supplying passage, may have a labyrinth structure. Accordingly, it is possible to easily and reliably remove water produced by the reaction.

According to another aspect of the present invention, an anode-side elemental member, which constructs each of a plurality of separators, is composed of a porous conductive material, for example, a porous carbon material. When a mixed solution of methanol and water is introduced into a passage provided on a back surface side of the anode-side elemental member, the mixed solution permeates through the anode-side elemental member. Thus, the mixed solution is supplied to an anode which is in contact with a front surface side of the anode-side elemental member. Accordingly, the aqueous methanol solution can be supplied at a uniform concentration to an entire operating surface of the anode. Thus, it is possible to reliably supply a proper amount of the aqueous methanol solution to the entire anode.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
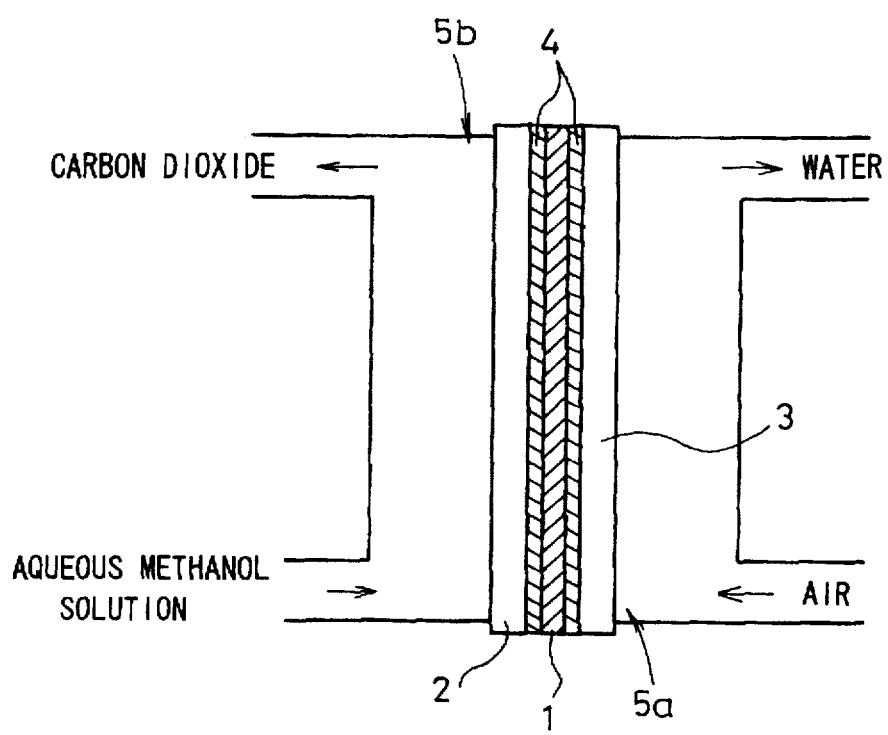
FIG. 1 shows a schematic illustration a direct methanol type fuel cell concerning the prior art.
Figure 2:
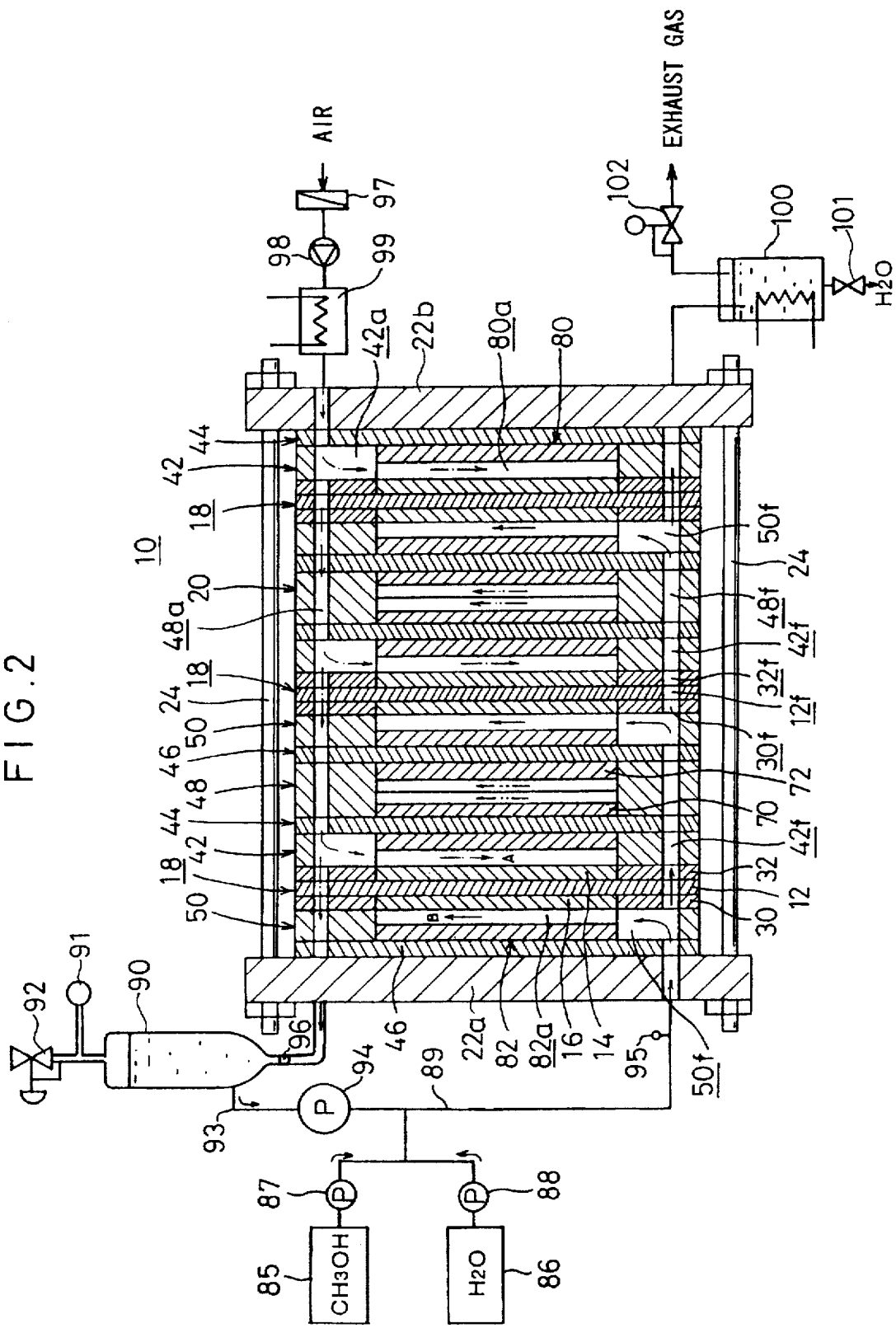
FIG. 2 shows a vertical cross-sectional illustration of a direct methanol type fuel cell according to a first embodiment of the present invention.
Figure 3:
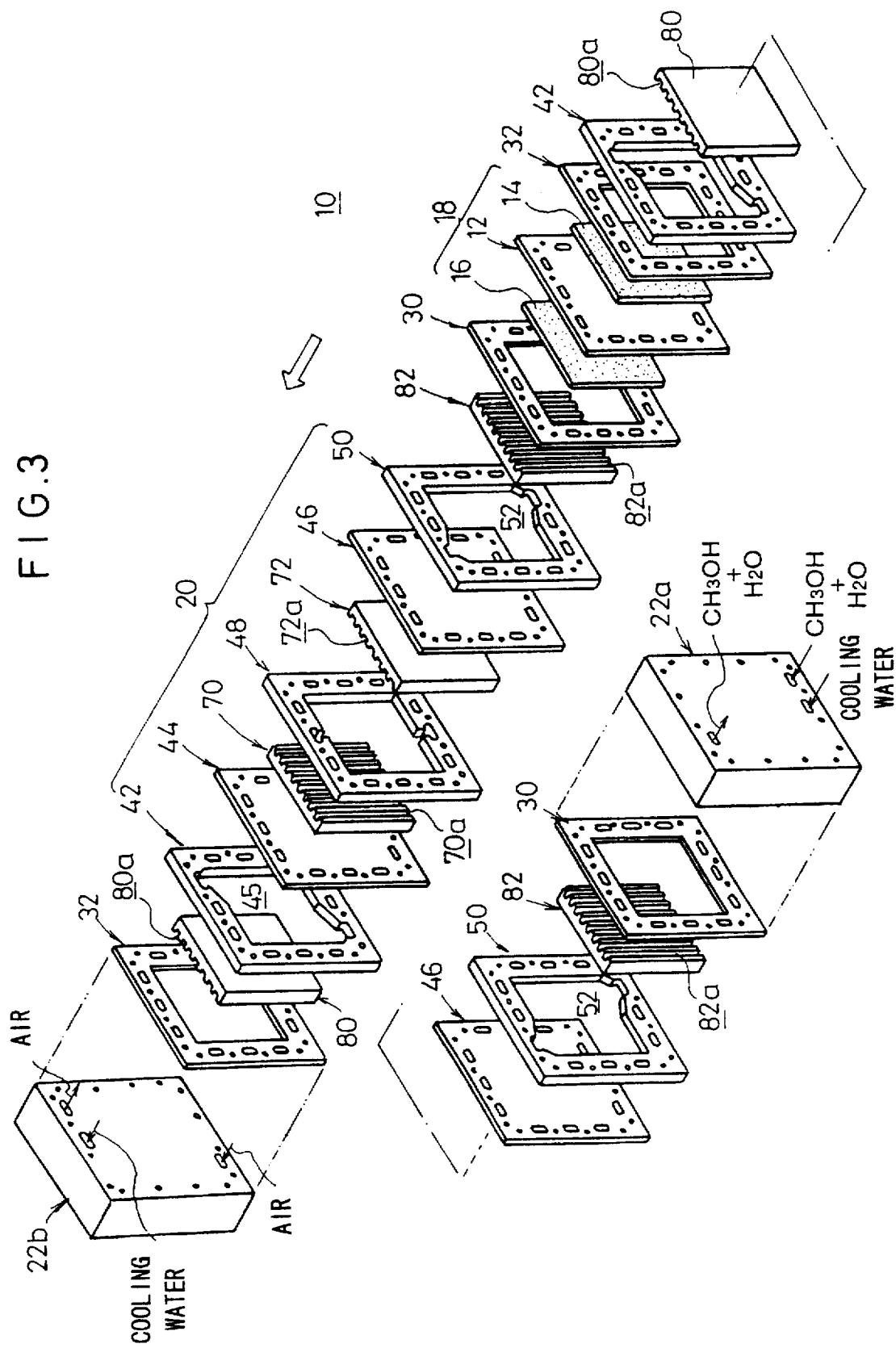
FIG. 3 shows an exploded perspective view of the direct methanol type fuel cell shown in FIG. 2.

FIG. 2 shows a vertical cross-sectional view of a direct methanol type fuel cell 10 according to a first embodiment of the present invention. FIG. 3 shows an exploded perspective illustration of the direct methanol type fuel cell 10.

In the first embodiment, the direct methanol type fuel cell 10 comprises a plurality of fuel cell units 18 each including a cathode 14 and an anode 16 provided opposingly with an ion exchange membrane 12 interposed therebetween, and a plurality of separators 20 for interposing the fuel cell units 18 therebetween. The fuel cell units 18 and the separators 20 are integrally fixed by a pair of end plates 22a, 22b and four tie rods 24.

Figure 4:
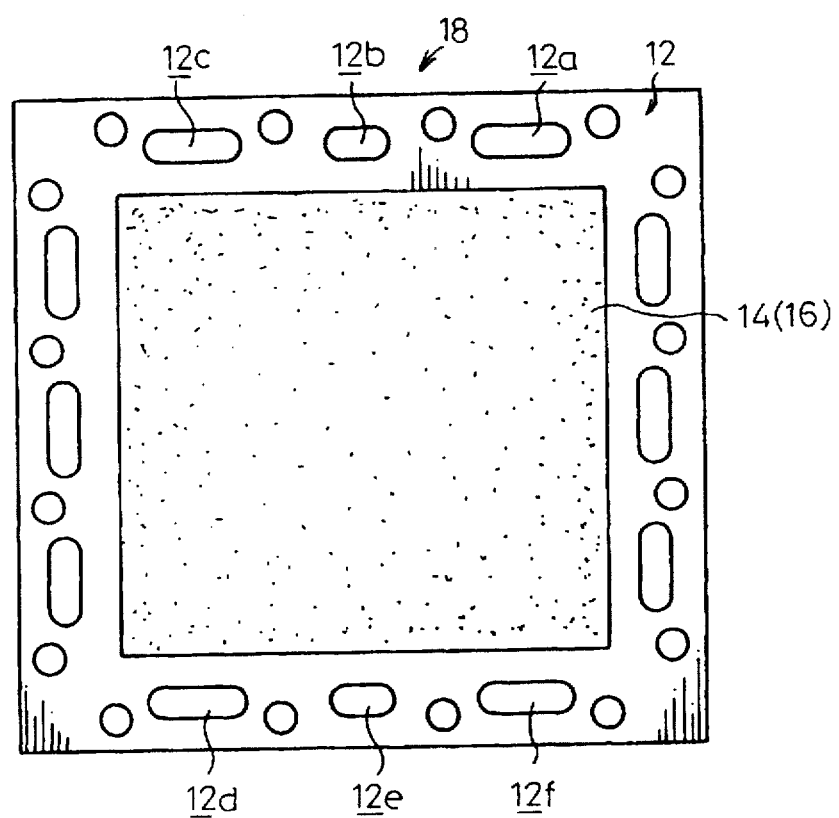
FIG. 4 shows a front view of an ion exchange membrane and an electrode shown in FIG. 3.

As shown in FIG. 4, the ion exchange membrane 12 is provided, at its upper portion, with an oxygen containing gas introducing hole 12a, a cooling water-discharging hole 12b, and a fuel-discharging hole 12c for discharging an unreacted part of an aqueous methanol solution and produced carbon dioxide gas. The ion exchange membrane 12 is provided, at its lower portion, with an oxygen containing gas discharging hole 12d, a cooling water-introducing hole 12e, and a fuel-introducing hole 12f for introducing a mixed solution of methanol and water.

Figure 5:
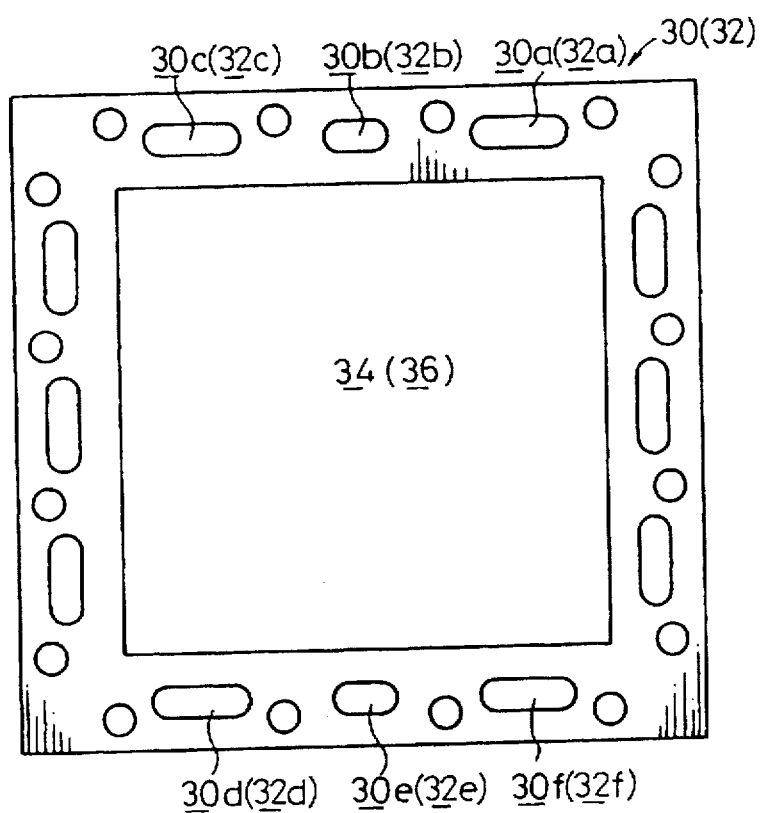
FIG. 5 shows a front view of a gasket shown in FIG. 3.

A first gasket 30 and a second gasket 32 are arranged on both sides of the fuel cell unit 18. The first gasket 30 has a large opening 34 for accommodating the anode 16, and the second gasket 32 has a large opening 36 for accommodating a cathode 14. As shown in FIG. 5, the first and second gaskets 30, 32 are provided, at their upper portions, with oxygen containing gas introducing holes 30a, 32a, cooling water-discharging holes 30b, 32b, and fuel-discharging holes 30c, 32c respectively. The first and second gaskets 30, 32 are provided, at their lower portions, with oxygen containing gas discharging holes 30d, 32d, cooling water-introducing holes 30e, 32e, and fuel-introducing holes 30f, 32f respectively.

The separator 20 basically comprises a first manifold plate 42, a first surface pressure-generating plate 44 which abuts against the first manifold plate 42, a main separator body 48 which is interposed between the first surface pressure-generating plate 44 and a second surface pressure-generating plate 46, and a second manifold plate 50 which abuts against the second surface pressure-generating plate 46.

Figure 6:
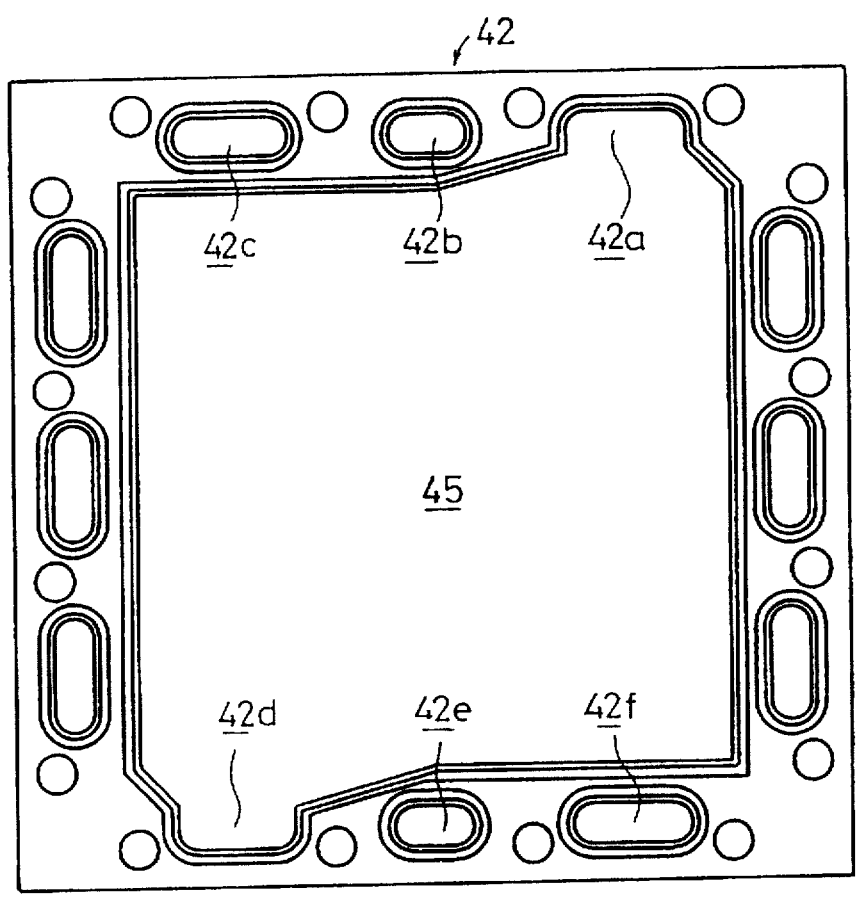
FIG. 6 shows a front view of a first manifold plate shown in FIG. 3.

As shown in FIG. 6, the first manifold plate 42 is composed of a rectangular flat plate. An oxygen containing gas supplying recess 42a for supplying oxygen containing gas is provided at an upper-right corner of the first manifold plate 42. A cooling water-discharging hole 42b for discharging cooling water is provided adjacent to the oxygen containing gas supplying recess 42a. A fuel-discharging hole 42c for discharging the unreacted part of the aqueous methanol solution and produced carbon dioxide gas is provided at an upper-left corner of the first manifold plate 42. An oxygen containing gas discharging recess 42d is provided at a lower-left corner of the first manifold plate 42. A cooling water-introducing hole 42e and a fuel-introducing hole 42f for introducing methanol and water are provided in this order in a region ranging from the oxygen containing gas discharging recess 42d to a lower-right corner of the first manifold plate 42. The oxygen containing gas supplying recess 42a communicates with the oxygen containing gas discharging recess 42d through an opening 45 in which an oxygen containing gas flow-adjusting plate 80 is accommodated as described later on.

Figure 7:
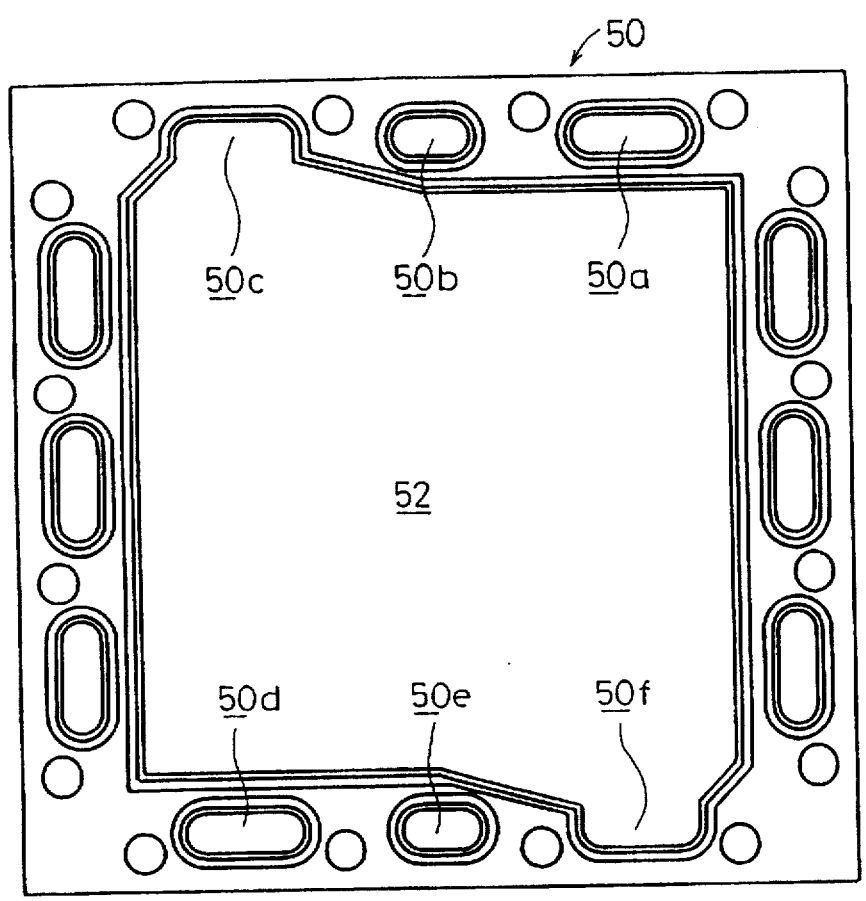
FIG. 7 shows a front view of a second manifold plate shown in FIG. 3.

The first manifold plate 42 and the second manifold plate 50 are basically configured to be symmetrical to one another, and the latter is shown in FIG. 7. Detailed explanation for the second manifold plate 50 is omitted. However, the second manifold plate 50 is provided, at its upper portion, with an oxygen containing gas supplying hole 50a, a cooling water-discharging hole 50b, and a fuel-discharging recess 50c, while it is provided, at its lower portion, an oxygen containing gas discharging hole 50d, a cooling water-introducing hole 50e, and a fuel-introducing recess 50f. The fuel-discharging recess 50c communicates with the fuel-introducing recess 50f through an opening 52 in which an aqueous methanol solution flow-adjusting plate 82 is accommodated as described later on.

Figure 8:
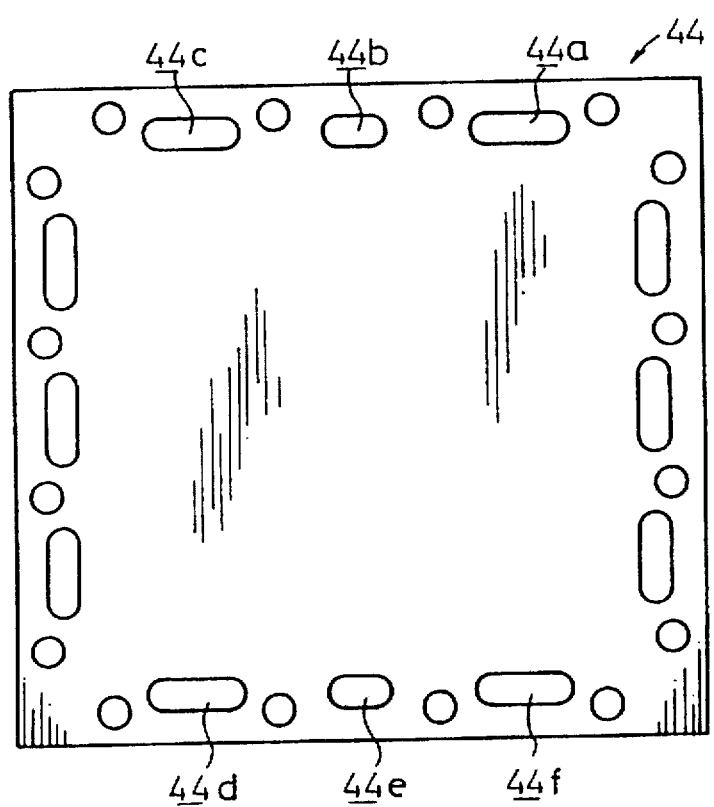
FIG. 8 shows a front view of a surface pressure-generating plate shown in FIG. 3.

As shown in FIG. 8, the first surface pressure-generating plate 44 is a flat plate composed of an electronically conductive material, or it is integrated with or processed and produced with the same material as the oxygen containing gas flow-adjusting plate 80 described later on. The first surface pressure-generating plate 44 is provided, at its upper portion, with an oxygen containing gas supplying communication hole 44a which communicates with the oxygen containing gas supplying recess 42a of the first manifold plate 42, a cooling water-discharging communication hole 44b which communicates with the cooling water-discharging hole 42b, and a communication hole 44c which communicates with the fuel-discharging hole 42c. The first surface pressure-generating plate 44 is provided, at its lower portion, with a communication hole 44d which communicates with the oxygen containing gas discharging recess 42d of the first manifold plate 42, a communication hole 44e which communicates with the cooling water-introducing hole 42e, and a communication hole 44f which communicates with the fuel-introducing hole 42f.

The second surface pressure-generating plate 46 is constructed in substantially the same manner as the first surface pressure-generating plate 44 described above, detailed explanation of which is omitted.

Figure 9:
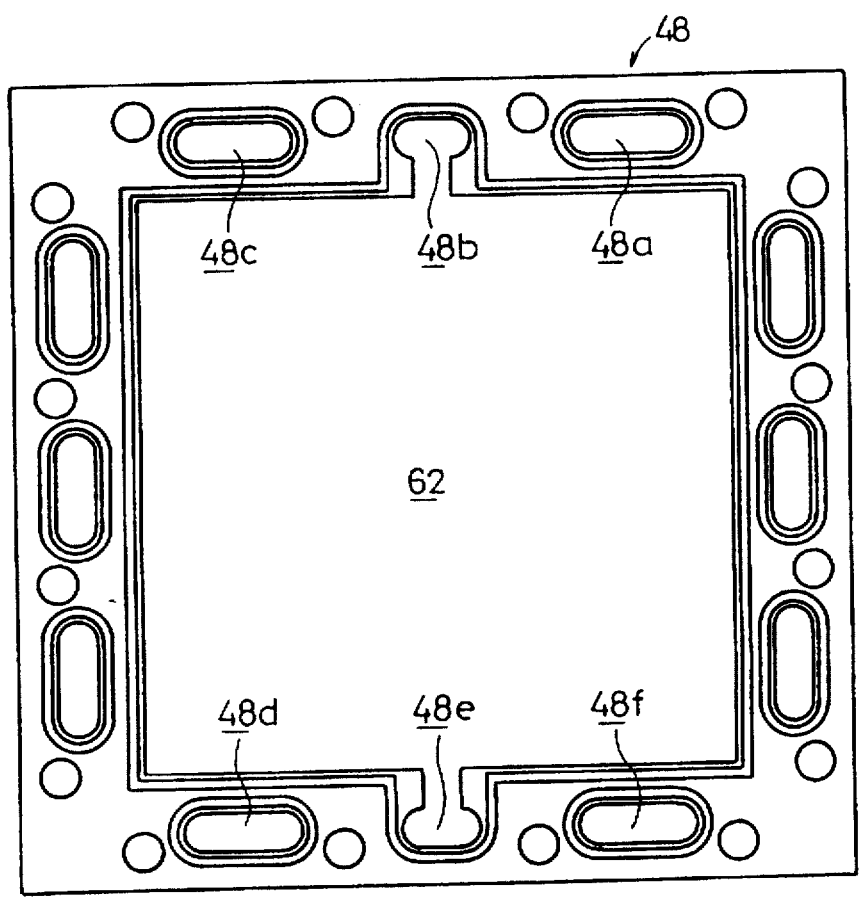
FIG. 9 shows a front view of a main separator body shown in FIG. 3.

FIG. 9 shows the third manifold plate, i.e., the main separator body 48 to be interposed between the first manifold plate 42 and the second manifold plate 50. The main separator body 48 is provided for supplying cooling water to cool the fuel cell unit 18. The main separator unit 48, which is relatively thick, is preferably composed of a conductive dense material (solid body). The main separator body 48 has, at its upper-right corner, an oxygen containing gas supplying hole 48a to communicate with the oxygen containing gas supplying recess 42a of the first manifold plate 42 and the communication hole 44a of the first surface pressure-generating plate 44. A cooling water-discharging recess 48b, which communicates with the cooling water-discharging hole 42b of the first manifold plate 42 and the communication hole 44b of the first surface pressure-generating plate 44, is provided at a substantially upper central portion of the main separator body 48, adjacent to the hole 48a. The main separator body 48 is provided, at its upper-left corner, with a fuel-discharging hole 48c which communicates with the fuel-discharging hole 42c of the first manifold plate 42 and the communication hole 44c of the first surface pressure-generating plate 44. The main separator body 48 is provided, at its lower-left corner, with an oxygen containing gas discharging hole 48d which communicates with the oxygen containing gas discharging recess 42d of the first manifold plate 42 and the communication hole 44d of the first surface pressure-generating plate 44. A cooling water-introducing recess 48e is provided just under the cooling water-discharging recess 48b as shown in FIG. 8. The main separator body 48 is provided, at its lower-right corner, a fuel-introducing hole 48f. The cooling water-discharging recess 48b communicates with the cooling water-introducing recess 48e through an opening 62 which is defined to have a large area.

Cooling water flow-adjusting plates 70, 72 are fitted and secured to the opening 62 of the main separator body 48. When the cooling water flow-adjusting plates 70, 72 are joined with each other, they have a thickness which is substantially the same as a thickness of the main separator body 48. The cooling water flow-adjusting plate 70 has a plurality of parallel grooves 70a which extend vertically as shown in FIG. 2. The cooling water flow-adjusting plate 72 also has a plurality of parallel grooves 72a in juxtaposition. When the cooling water flow-adjusting plates 70, 72 are combined, the grooves 70a, 72a mutually define large cooling water flow-adjusting passages respectively. The respective cooling water flow-adjusting passages are certainly in a state of communication with the cooling water-discharging recess 48b and the cooling water-introducing recess 48e.

Figure 10:
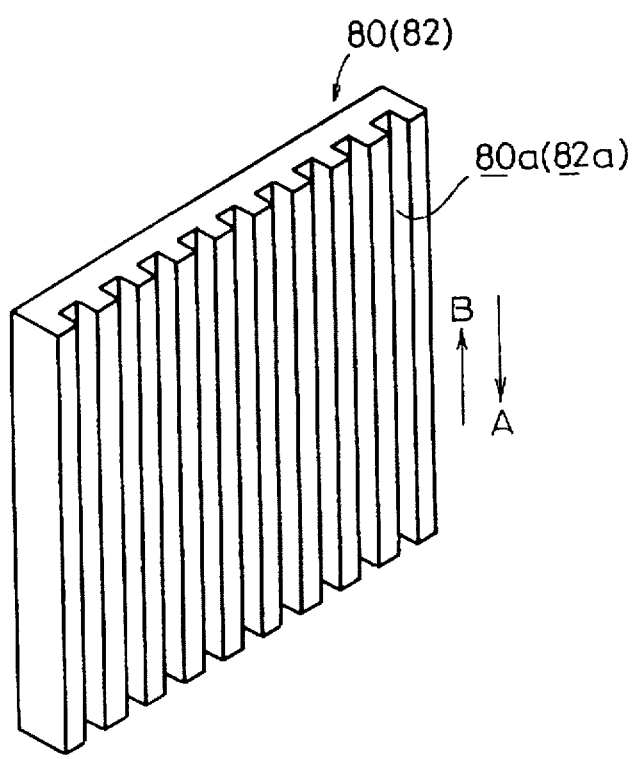
FIG. 10 shows a perspective view of a flow-adjusting plate shown in FIG. 3.

As shown in FIGS. 2, 3, and 10, an oxygen containing gas flow-adjusting plate (cathode-side elemental member) 80 is fitted to the opening 45 of the first manifold plate 42. A first surface of the oxygen containing gas flow-adjusting plate 80 is configured to be flat. A plurality of parallel grooves (oxygen containing gas supplying fluid passages) 80a, which extend vertically, are formed on a second surface of the oxygen containing gas flow-adjusting plate 80. The parallel grooves 80a allow the oxygen containing gas supplying recess 42a to communicate with the oxygen containing gas discharging recess 42d. Oxygen containing gas is allowed to flow along the grooves 80a in a direction of gravity (see the direction indicated by an arrow A in FIGS. 2 and 10).

An aqueous methanol solution flow-adjusting plate (anode-side elemental member) 82 is fitted to the opening 52 of the second manifold plate 50. A first surface of the aqueous methanol solution flow-adjusting plate 82 is configured to be flat. A plurality of parallel grooves (aqueous methanol solution-supplying fluid passages) 82a, which extend vertically, are formed on a second surface of the aqueous methanol solution flow-adjusting plate 82. The parallel grooves 82a allow the fuel-discharging recess 50a to communicate with the fuel-introducing recess 50f. A mixed solution of methanol and water is allowed to flow along the grooves 82a in a direction opposite to the gravity (see the direction indicated by an arrow B in FIGS. 2 and 10).

A thickness of the first manifold plate 42 and the oxygen containing gas flow-adjusting plate 80 is substantially the same as a thickness of the second manifold plate 50 and the aqueous methanol solution flow-adjusting plate 82.

The main separator body 48 constructed as described above is interposed between the first surface pressure-generating plate 44 and the second surface pressure-generating plate 46, and they are interposed between the first manifold plate 42 and the second manifold plate 50. The second gasket 32 abuts against the first manifold plate 42, and the first gasket 30 abuts against the second manifold plate 50. The fuel cell unit 18 is interposed between the gasket 30 and the gasket 32.

The fuel cell will be explained below along a direction indicated by an arrow shown in FIG. 3. A combination is obtained by using, for example, the first manifold plate 42 including the oxygen containing gas flow-adjusting plate 80 incorporated therein, the second gasket 32, the cathode 14, the ion exchange membrane 12, the anode 16, the first gasket 30, the second manifold plate 50 including the aqueous methanol solution flow-adjusting plate 82, the second surface pressure-generating plate 46, the main separator body 48 including the flow-adjusting plates 70, 72 incorporated therein, and the first surface pressure-generating plate 44. A large number of the combinations are stacked so that one stacking end abuts against the end plate 22a, and the other stacking end abuts against the end plate 22b. The end plates 22a, 22b are integrally fixed by the aid of the tie rods 24. In this embodiment, as shown in FIG. 2, a methanol tank 85 and a water tank 86 are connected to a supply passage 89 through pumps 87, 88 respectively. The supply passage 89 communicates with an aqueous methanol solution-supplying port of the end plate 22a. An aqueous methanol solution-storing tank 90, which communicates with an aqueous methanol solution-discharging port of the end plate 22a (see FIG. 3), is provided with a back pressure valve 92 together with a pressure sensor 91. A pump 94 is connected to a circulating passage 93 which communicates from the aqueous methanol solution-storing tank 90 to the supply passage 89. First and second concentration sensors 95, 96 for detecting the concentration of the aqueous methanol solution are arranged on a downstream side of the supply passage 89 and on a lower end side of the aqueous methanol solution-storing tank 90.

For example, the oxygen containing gas is air. The air is supplied to the inside of the fuel cell 10 through a filter 97, a blower (or compressor) 98, and a radiator 99. The air is discharged from the fuel cell 10, which is cooled by a radiator 100 to remove water through a valve 101. The air is then exhausted to the outside through a back pressure valve 102.

The operation of the direct methanol type fuel cell 10 constructed as described above will be explained below.

As shown in FIG. 2, methanol and water are supplied from the methanol tank 86 and the water tank 72 respectively, and they are mixed in the supply passage 89. The mixed solution of methanol and water is introduced into the fuel passage in the direct methanol type fuel cell 10, that is, for example, the fuel-introducing hole 42f of the first manifold plate 42 which constructs the separator 20, the fuel-introducing holes 30f, 12f, 32f of the fuel cell unit 18, and the fuel-introducing recess 50f of the second manifold plate 50. The mixed solution is allowed to flow in the direction opposite to the gravity from the fuel-introducing recess 50f of the second manifold plate 50 along the grooves 82a of the aqueous methanol solution flow-adjusting plate 82. Accordingly, the mixed solution of water and methanol as fuel is supplied to the anode 16.

On the other hand, the air as the oxygen containing gas passes through the filter 97, the blower 98, and the radiator 99. The air arrives at the oxygen containing gas passage in the direct methanol type fuel cell 10, that is the oxygen containing gas supplying recess 42a of the first manifold plate 42 and the oxygen containing gas introducing holes 30a, 12a, 32a of the fuel cell unit 18. The air is then supplied to the oxygen containing gas supplying hole 50a of the second manifold plate 50. The air supplied to the oxygen containing gas supplying recess 42a is introduced into the grooves 80a of the oxygen containing gas flow-adjusting plate 80, and it flows in the direction of gravity along the grooves 80a. Thus, the air is supplied to the cathode 14 which constructs the fuel cell unit 18. Unreacted air is discharged to the outside of the direct methanol type fuel cell 10 through the oxygen containing gas discharging recess 42d of the first manifold plate 42 and so Cooling water passes through the cooling water-introducing hole 42e of the first manifold plate 42, the cooling water-introducing holes 30e, 12e, 32e of the fuel cell unit 18, and the cooling water-introducing hole 50e of the second manifold plate 50, and it arrives at the cooling water-introducing recess 48e of the main separator body 48. Cooling water is introduced from the recess 48e into the grooves 70a, 72a between the cooling water flow-adjusting plates 70, 72. Cooling water flows from the bottom to the top through shaped spades of the grooves 70a, 72a.

Methanol reacts with water to produce carbon dioxide gas and hydrogen ion on the anode 16 as shown in the following formula (1):

$$CH_3OH+H_2O \rightarrow CO_2+6H^++6e^- \quad (1)$$

Produced hydrogen ion diffuses and moves through the ion exchange membrane 12 toward the cathode 14. Hydrogen ion reacts with electron and oxygen in air through an external circuit on the cathode 14 as shown in the following formula (2):

$$6H^++3/2.O_2+6e^- \rightarrow 3H_2O \quad (2)$$

As for the aqueous methanol solution supplied to the anode 16, an unreacted part of the aqueous methanol solution is supplied to the fuel-discharging recess 50c of the second manifold plate 50 together with produced carbon dioxide gas (carbonic acid gas), and it is discharged to the outside of the direct methanol type fuel cell 10 through the communication hole 44c, the fuel-discharging holes 42c, 32c, 12c, 30c, etc. in communication with the fuel-discharging recess 50c.

In the first embodiment, the grooves 82a of the aqueous methanol solution flow-adjusting plate 32 are formed in parallel to the direction of gravity, and the grooves 80a of the oxygen containing gas flow-adjusting plate 80 are also formed in parallel to the direction of gravity. The aqueous methanol solution flows through the grooves 82a in the direction opposite to the gravity, while the air flows through the grooves 80a in the direction of gravity (see FIG. 2).

Accordingly, the aqueous methanol solution as the fuel and the air as the oxygen containing gas flow in the fuel cell unit 18 in the opposite directions as counterflows. Thus, it is possible to minimize the ununiform temperature distribution over the entire fuel cell unit 18 as less as possible. Therefore, an effect is obtained in that a stable output voltage can be easily and reliably obtained from the fuel cell unit 18.

The aqueous methanol solution flows in the direction opposite to the gravity along the grooves 82a of the aqueous methanol solution flow-adjusting plate 82. Accordingly, carbon dioxide gas, which is produced upon the reaction of the aqueous methanol solution as shown in the formula (1), is smoothly discharged upwardly. No carbon dioxide gas remains in the fuel cell unit 18.

Figure 11:
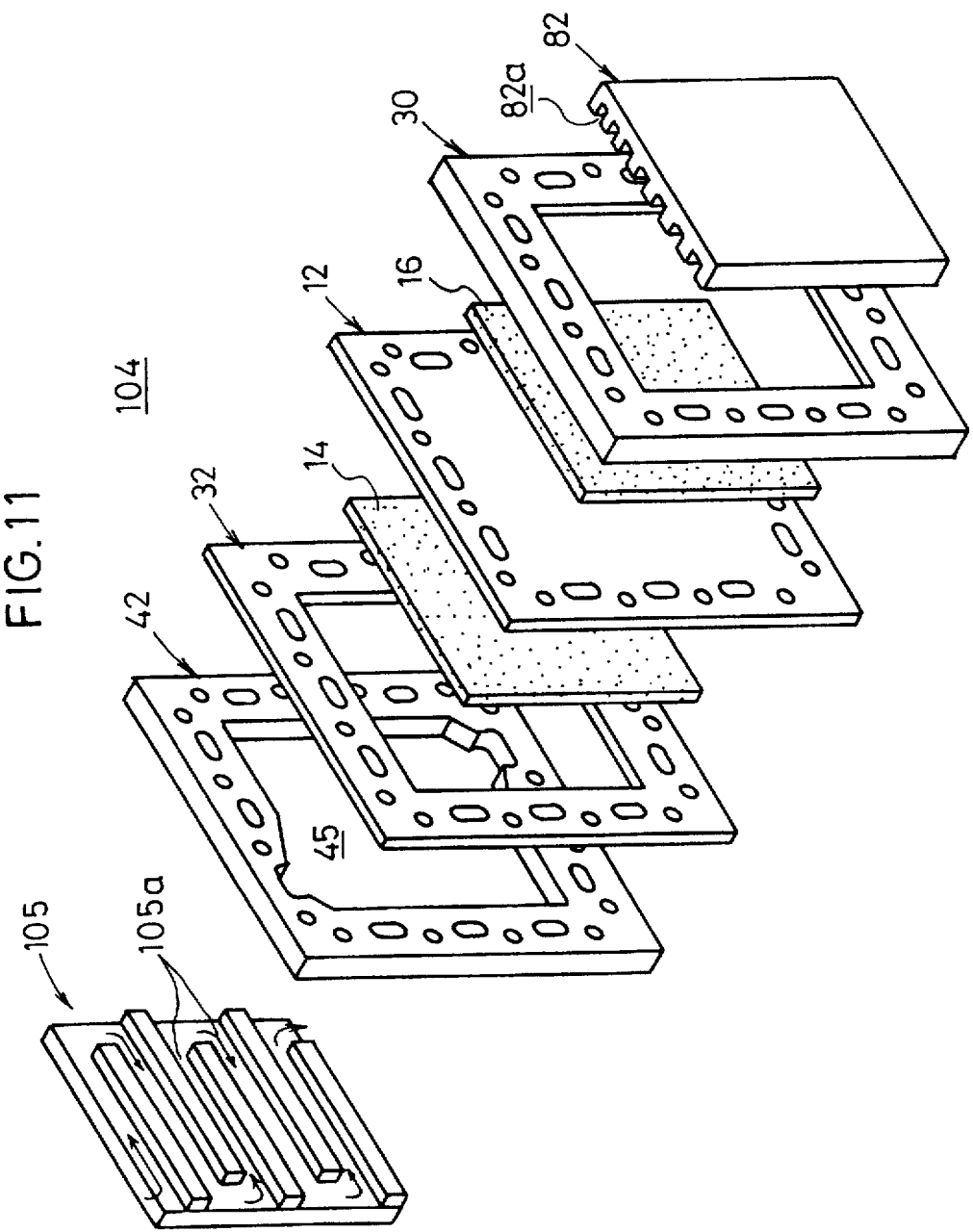
FIG. 11 shows an exploded perspective illustration of principal parts of a direct methanol type fuel cell according to a second embodiment of the present invention.

Next, a direct methanol type fuel cell 104 according to a second embodiment of the present invention is shown in FIG. 11.

The direct methanol type fuel cell 104 is basically constructed in the same manner as the direct methanol type fuel cell 10 according to the first embodiment. However, an oxygen containing gas flow-adjusting plate 105 has a structure different from the structure of the oxygen containing gas flow-adjusting plate 80 described above. Namely, the oxygen containing gas flow-adjusting plate 105 has its first surface which is flat, and its second surface on which a labyrinth passage 105a is provided, wherein the oxygen containing gas meanders vertically through the labyrinth passage 105a.

In the direct methanol type fuel cell 104 constructed as described above, the oxygen containing gas (air) flows in the direction of gravity along the labyrinth passage 105a formed on the oxygen containing gas flow-adjusting plate 105. Accordingly, the aqueous methanol solution and the oxygen containing gas flow as counterflows in the opposite directions. It is possible to minimize the ununiform temperature distribution over the entire fuel cell unit 18 as less as possible in the same manner as the first embodiment. Moreover, an advantage is obtained in that water, which is produced by the reaction on the side of the oxygen containing gas flow-adjusting plate 105 as shown in the formula (2), is smoothly removed along the labyrinth passage 105a.

Figure 12:
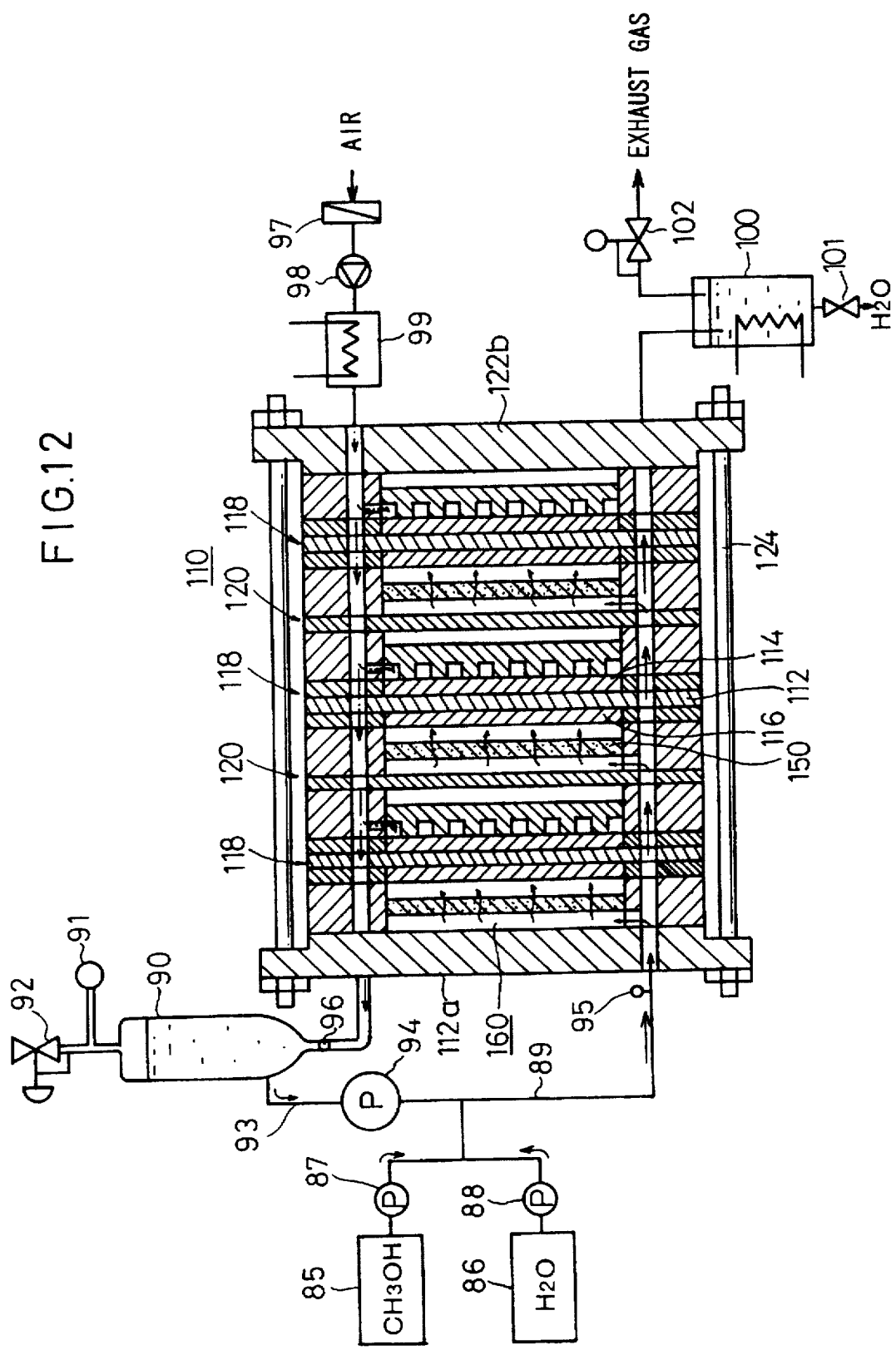
FIG. 12 shows a schematic illustration of a system of a direct methanol type fuel cell according to a third embodiment of the present invention.
Figure 13:
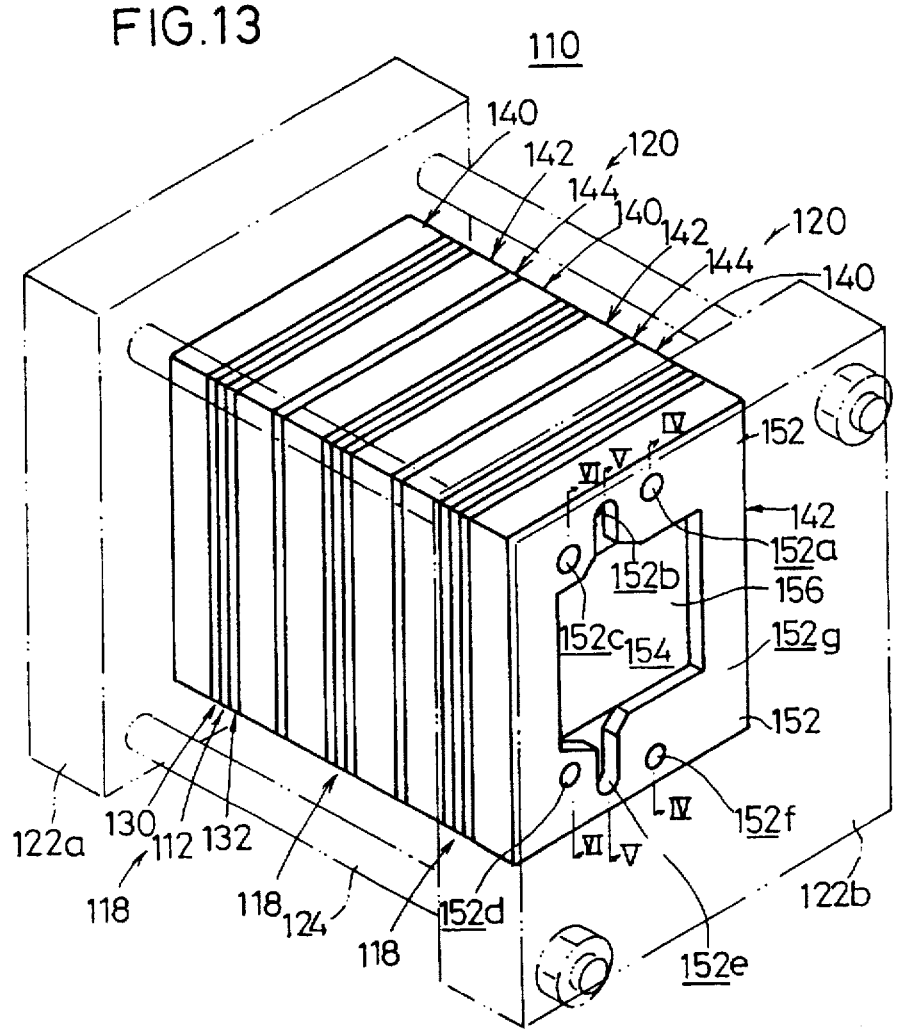
FIG. 13 shows a schematic perspective illustration of the fuel cell shown in FIG. 12.

FIG. 12 schematically shows a system of a direct methanol type fuel cell 110 according to a third embodiment of the present invention. In this embodiment, as the same constitutional components as those described in the foregoing embodiments are designated by the same reference numerals, detail explanation of which will be omitted. The fuel cell 110 comprises a plurality of fuel cell units 118 each including a cathode 114 and an anode 116 provided opposingly with an ion exchange membrane 112 interposed therebetween, and a plurality of separators 120 for interposing the fuel cell units 118 therebetween. The fuel cell units 118 and the separators 120 are integrally fixed by a pair of end plates 122a, 122b and four tie rods 124 (see FIG. 12 and 13).

Figure 14:
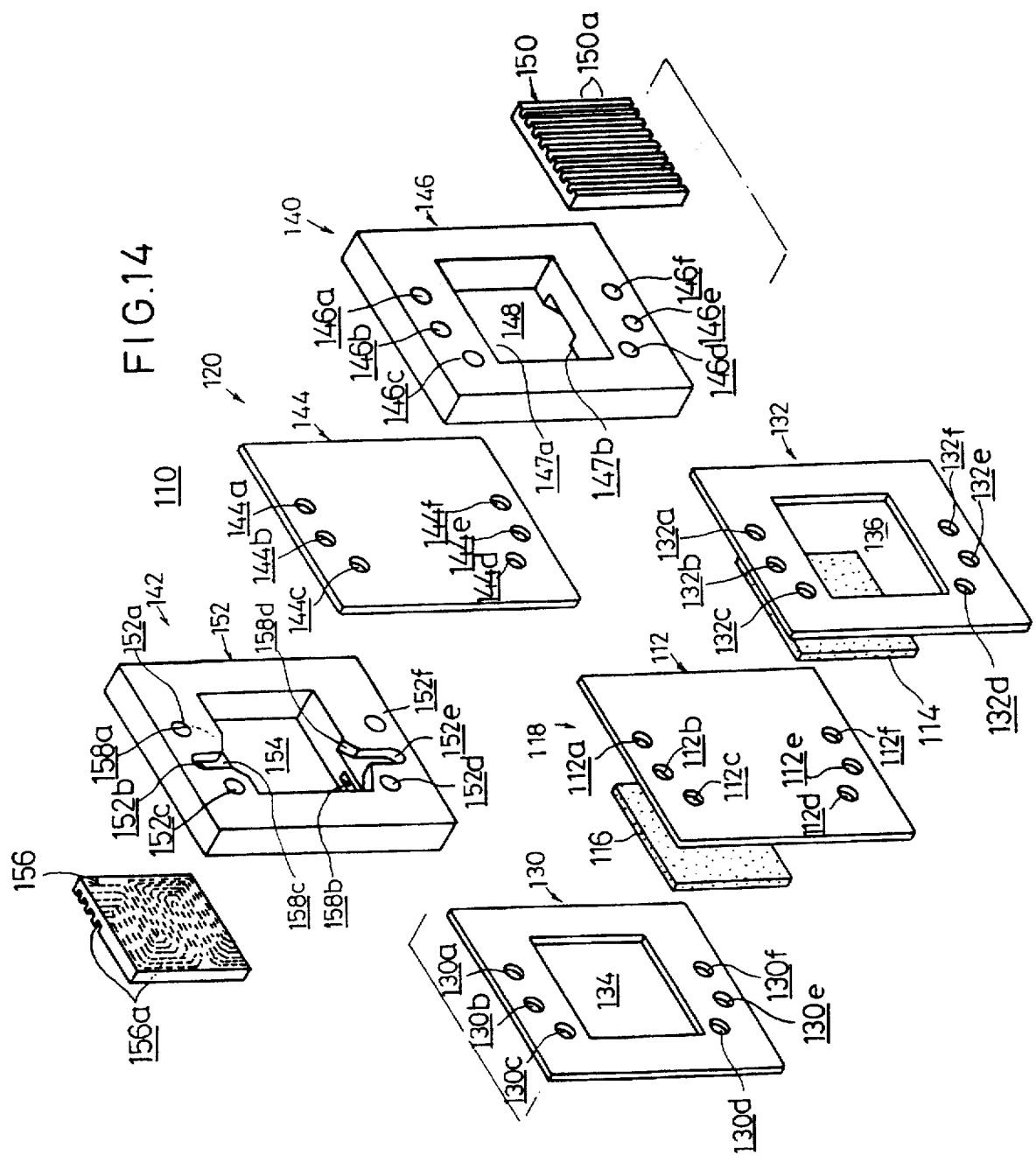
FIG. 14 shows an exploded perspective illustration of a part of the fuel cell shown in FIG. 12.

As shown in FIG. 14, the ion exchange membrane 112 is provided, at its upper portion, with an oxygen containing gas introducing hole 112a, a cooling water-discharging hole 112b, and a fuel-discharging hole 112c for discharging an unreacted part of an aqueous methanol solution and produced carbon dioxide gas. The ion exchange membrane 112 is provided, at its lower portion, with an oxygen containing gas discharging hole 112d, a cooling water-introducing hole 112e, and a fuel-introducing hole 112f for introducing a mixed solution of methanol and water.

A first gasket 130 and a second gasket 132 are arranged on both sides of the fuel cell unit 118. The first gasket 130 has a large opening 134 for accommodating the anode 116, and the second gasket 132 has a large opening 136 for accommodating a cathode 114. The first and second gaskets 130, 132 are provided, at their upper portions, with oxygen containing gas introducing holes 130a, 132a, cooling water-discharging holes 130b, 132b, and fuel-discharging holes 130c, 132c respectively. The first and second gaskets 130, 132 are provided, at their lower portions, with oxygen containing gas discharging holes 130d, 132d, cooling water-introducing holes 130e, 132e, and fuel-introducing holes 130f, 132f respectively.

The separator 120 includes a first separator section 140 located on a side of the anode 116, a second separator section 142 located on a side of the cathode 114, and a partition plate 144 interposed between the first and second separator sections 140, 142.

A first manifold plate 146 for constructing the first separator section 140 is composed of a rectangular flat plate with a large opening 148 provided through its center. The first manifold plate 146 is provided, at its upper portion, with an oxygen containing gas introducing hole 146a, a cooling water-discharging hole 146b, and a fuel-discharging hole 146c. The first manifold plate 146 is provided, at its lower portion, with an oxygen containing gas discharging hole 146d, a cooling water-introducing hole 146e, and a fuel-introducing hole 146f. The holes 146c, 146f of the first manifold plate 146 are in communication with each other through the opening 148 and recesses 147a, 147b provided on mutually different sides of the first manifold plate 146 (see FIGS. 14, 15, and 16).

An aqueous methanol solution flow-adjusting plate (anode-side elemental member) 150 is fitted to the opening 148 of the first manifold plate 146. The aqueous methanol solution flow-adjusting plate 150 has its first surface which is flat, and its second surface on which fuel-discharging passages 150a are formed. The fuel-discharging passages 150a extend in parallel in the direction of gravity (vertical direction). The hole 146c communicates with the passages 150a through the recess 147a. The mixed solution of methanol and water is supplied to a passage (described later on) formed on the flat surface side of the aqueous methanol solution flow-adjusting plate 150 which is formed of a porous conductive material for supplying the mixed solution of methanol and water to the anode 116 in accordance with permeation. Specifically, the aqueous methanol solution flow-adjusting plate 150 is composed of a porous carbon material such as a porous carbon sintered material. The aqueous methanol solution flow-adjusting plate 150, when it is formed of the porous carbon sintered material, desirably has porousness such that its porosity is not more than 70%, and its pore diameter is not more than 40 µm in order to avoid dripping of water.

Preferably, the aqueous methanol solution flow-adjusting plate 150 is composed of a porous material subjected to a water repellent treatment in order to improve durability. The water repellent treatment is performed, for example, by immersing the aqueous methanol solution flow-adjusting plate 150 in a dispersion solution of PTFE (polytetrafluoroethylene) adjusted at a predetermined concentration, and then drying it at room temperature, followed by firing at 300° to 380° C.

The second separator section 142 is constructed in the same manner as the first separator section 140 described above, which comprises a second manifold plate 152, and an oxygen containing gas flow-adjusting plate (cathode-side elemental member) 156 to fit to an opening 154 of the second manifold plate 152.

The second manifold plate 152 is provided, at its upper portion, with an oxygen containing gas introducing hole 152a, a cooling water-discharging hole 152b, and a fuel-discharging hole 152c. The second manifold plate 152 is provided, at its lower portion, with an oxygen containing gas discharging hole 152d, a cooling water-introducing hole 152e, and a fuel-introducing hole 152f. The holes 152a, 152d communicate with the opening 154 through recesses 158a, 158b provided on one surface side of the second manifold plate 152 (see FIGS. 14, 15, and 17). The holes 152b, 152e communicate with the opening 154 through recesses 158c, 158d (see FIG. 16).

The oxygen containing gas flow-adjusting plate 156 has its first surface which is flat, and its second surface on which passages 156a are formed. The oxygen containing gas meanders through the passages 156a toward the vertical direction. The oxygen containing gas flow-adjusting plate 156 is composed of a dense material, specifically, graphitized carbon, stainless steel, conductive metal having corrosion resistance such as nickel alloy including, for example, nickel alloy, conductive rubber, or conductive resin.

The partition plate 144 is composed of dense and conductive graphitized carbon, stainless steel, conductive metal having corrosion resistance such as nickel alloy, conductive rubber, conductive resin, or a material obtained by combining the foregoing. The partition plate 144 is provided, at its upper portion, with an oxygen containing gas introducing hole 144a, a cooling water-discharging hole 144b, and a fuel-discharging hole 144c. The partition plate 144 is provided, at its lower portion, with an oxygen containing gas discharging hole 144d, a cooling water-introducing hole 144e, and a fuel-introducing hole 144f.

Figure 15:
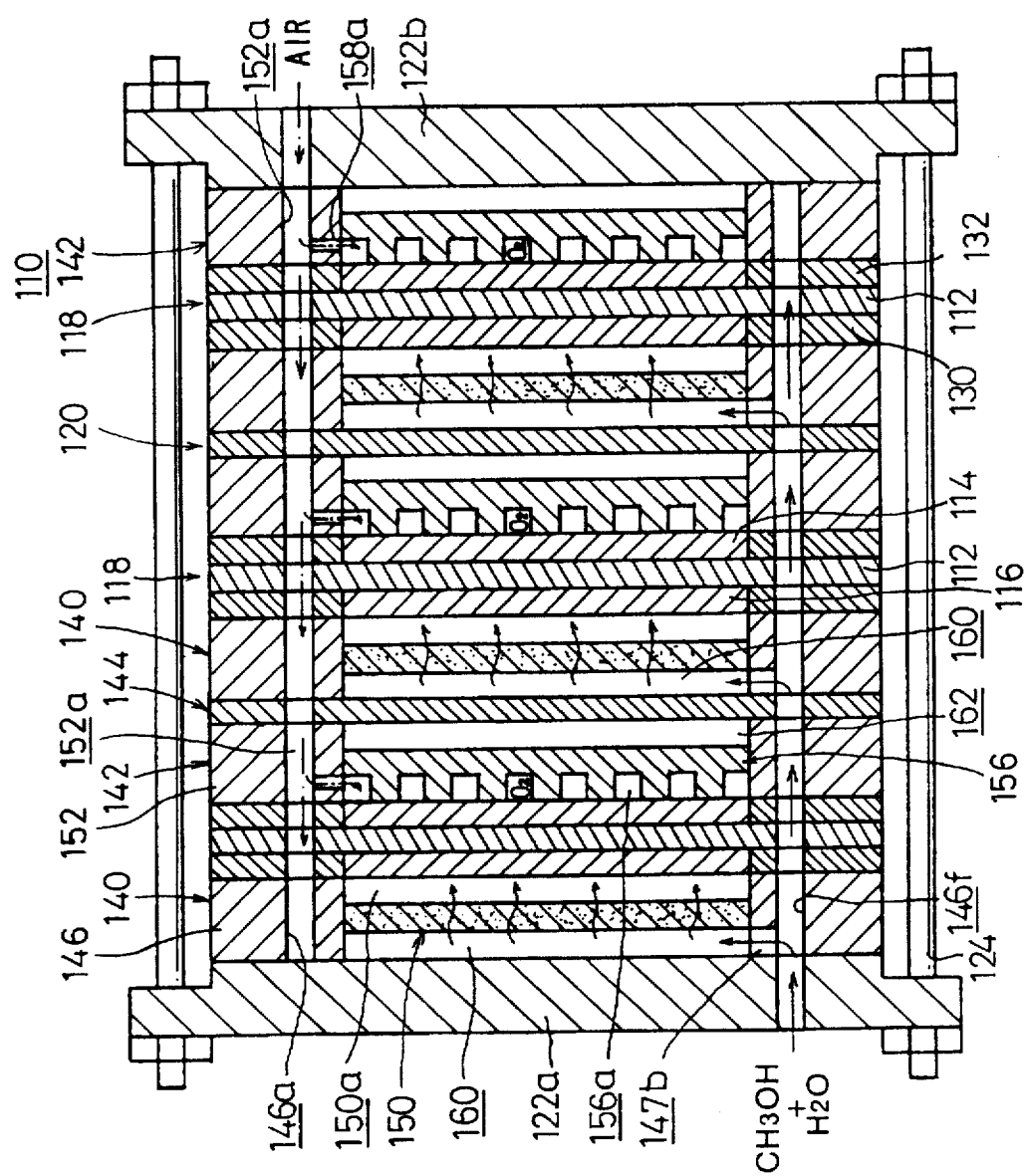
FIG. 15 shows a cross-sectional view taken along a line XV—XV in FIG. 13.
Figure 16:
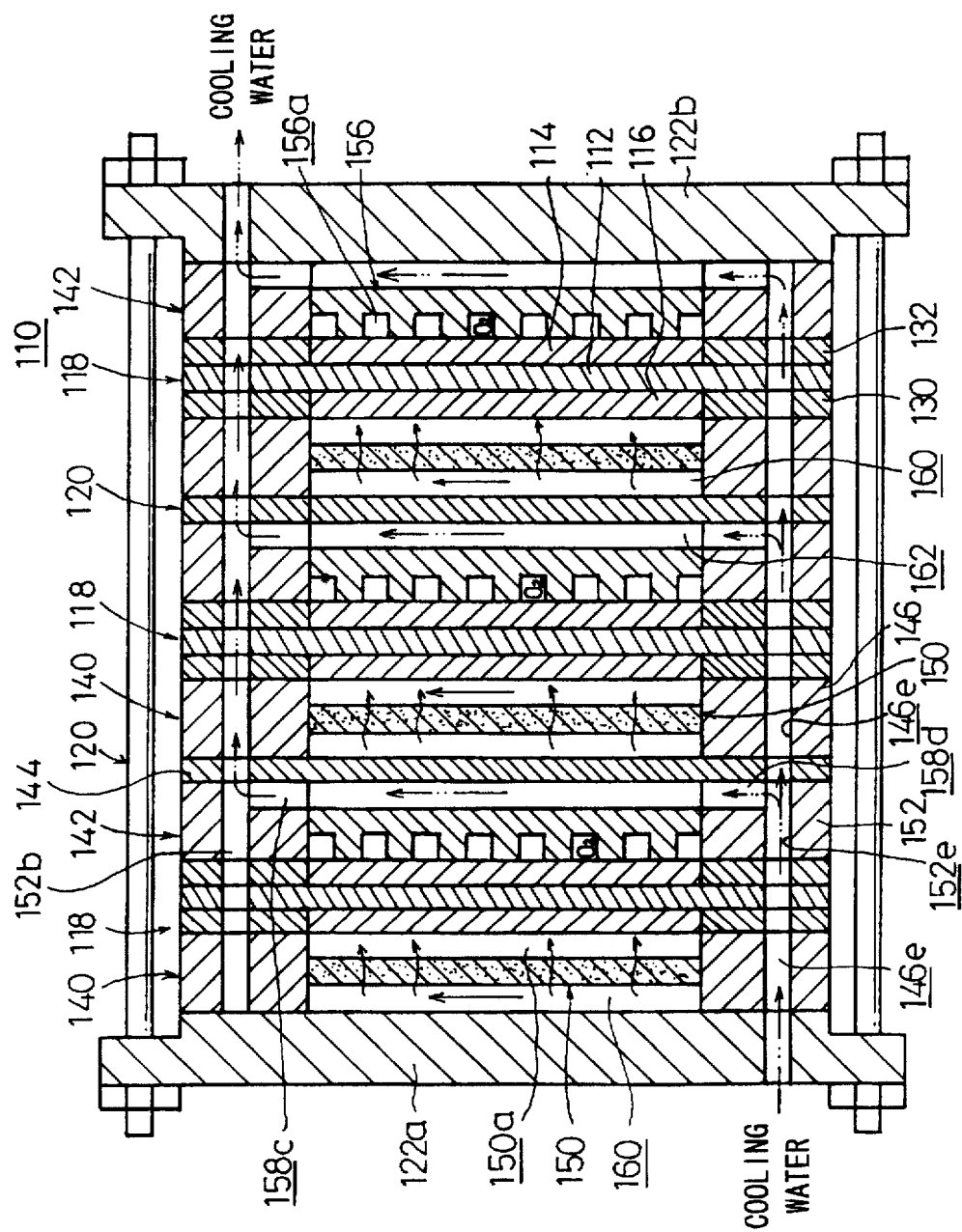
FIG. 16 shows a cross-sectional view taken along a line XVI—XVI in FIG. 13.

As shown in FIG. 15, the separator 120 has a first passage 160 for introducing the mixed solution of methanol and water thereinto, the first passage 160 being formed between the partition plate 144 and the flat surface side of the aqueous methanol solution flow-adjusting plate 150. As shown in FIG. 16, a second passage 162 for introducing cooling water for cooling the cathode 114 is provided between the partition plate 144 and the flat surface side of the oxygen containing gas flow-adjusting plate 156.

The operation of the fuel cell 110 constructed as described above will be explained below.

As shown in FIG. 12, methanol is supplied from a methanol tank 85 to a supply passage 89 under the action of a pump 87. Water is supplied from a water tank 86 to the supply passage 89 under the action of a pump 88. Accordingly, the mixed solution of methanol and water passes through the supply passage 89, and it arrives at the hole 152f of the second manifold plate 152 which constructs the second separator section 142 through the hole 146f of the first manifold plate 146 which constructs the first separator section 140 in the fuel cell 110, and the holes 130f, 112f, 132f of the fuel cell unit 118.

As shown in FIG. 15, the mixed solution passes through the hole 146f and the recess 147b of the first manifold plate 146, and it is introduced into the first passage 160 formed between the partition plate 144 and the aqueous methanol solution flow-adjusting plate 150. In this embodiment, the aqueous methanol solution flow-adjusting plate 150 is formed of the porous conductive material. Therefore, the mixed solution introduced into the first passage 160 permeates through the aqueous methanol solution flow-adjusting plate 150, and it arrives at the passage 150a. Thus, the mixed solution of water and methanol as fuel is supplied to the anode 116.

On the other hand, air as the oxygen containing gas is supplied from the outside through a filter 97 under the action of a blower (or compressor) 98. The air is cooled by a radiator 99, and then it is introduced into the fuel cell 110. The air is supplied to the hole 152a of the second manifold plate 152 which constructs the second separator section 142, through the hole 146a of the first manifold plate 146, and the holes 130a, 112a, 132a of the fuel cell unit 118.

Figure 17:
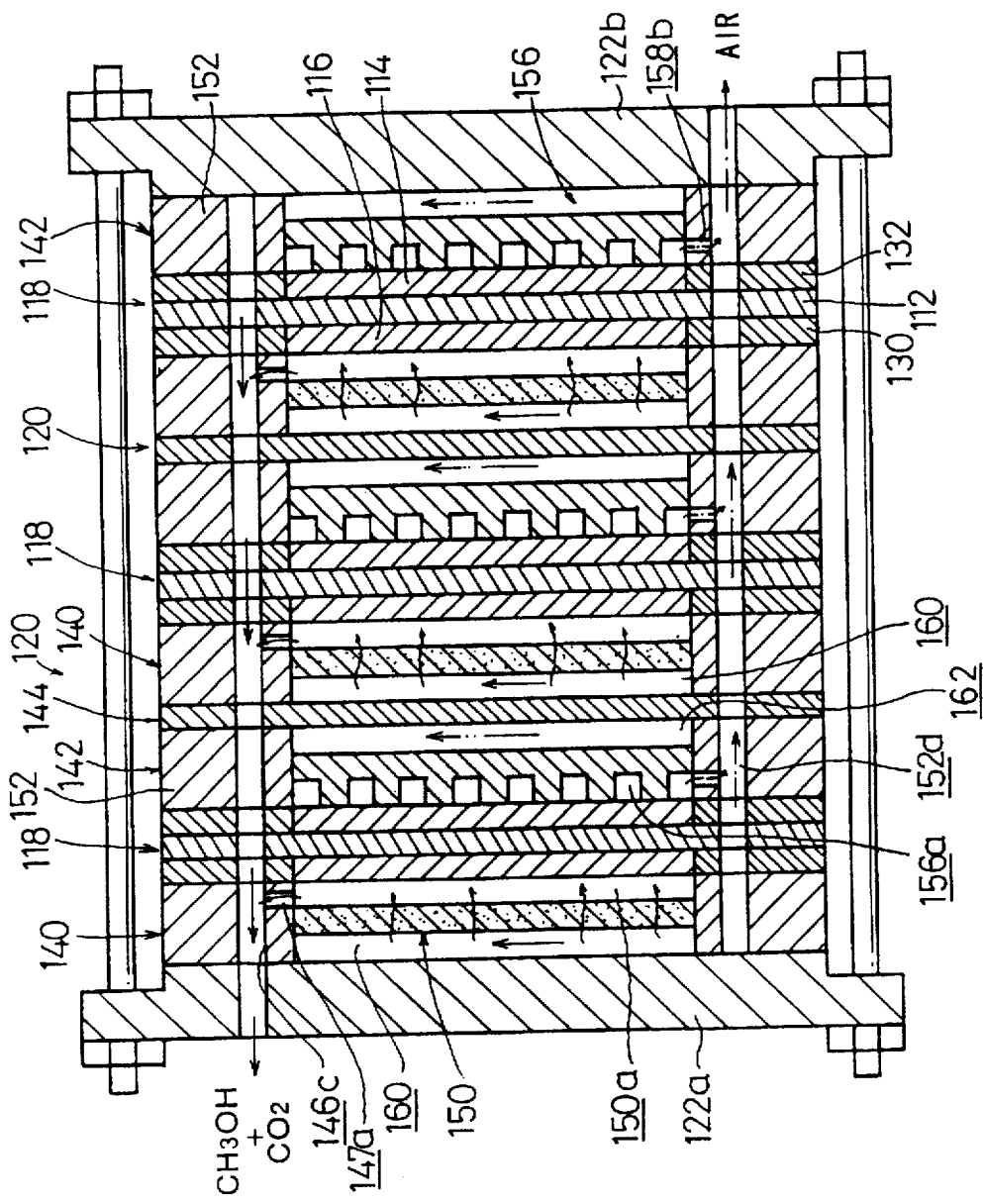
FIG. 17 shows a cross-sectional view taken along a line XVII—XVII in FIG. 13.

As shown in FIG. 15, the air supplied to the hole 152a is introduced into the passages 156a of the oxygen containing gas flow-adjusting plate 156 through the recess 158a, and it flows along the passages 156a. Thus, the air is supplied to the cathode 114 which constructs the fuel cell unit 118. As shown in FIG. 17, an unused part of the air is discharged to the outside of the fuel cell 110 through the hole 146d of the first manifold plate 146 and so on. Discharged air is cooled by a radiator 100 to remove water, and then it is exhausted to the outside through a back pressure valve 102 (see FIG. 12).

As shown in FIG. 16, cooling water passes through the hole 146e of the first separator section 140 and the holes 130e, 112e, 132e of the fuel cell unit 118, and it arrives at the hole 152e of the second separator section 142. The cooling water passes through the recess 158d which communicates with the hole 152e, and it is introduced into the second passage 162 formed between the partition plate 144 and the oxygen containing gas flow-adjusting plate 156. Thus, the cooling water flows from the bottom to the top through the second passage 162.

On the anode 116, methanol reacts with water on an electrode catalyst contained in the electrode to produce carbon dioxide gas and hydrogen ion as shown in the formula (1).

Hydrogen ion produced as described above diffuses and moves through the ion exchange membrane 112 toward the cathode 114. On the cathode 114, hydrogen ion reacts with oxygen in air to produce water as shown in the formula (2).

As for the aqueous methanol solution supplied to the anode 116, unreacted methanol and unreacted water are supplied to the hole 146c together with produced carbon dioxide gas (carbonic acid gas) through the recess 147a of the first separator section 140 as shown in FIG. 17, and they are introduced into an aqueous methanol solution-storing tank 90 through the holes 144c, 152c, 132c, 112c, 130c, etc. in communication with the hole 146c. Carbon dioxide gas coexisting in the aqueous methanol solution is removed in the aqueous methanol solution-storing tank 90. The aqueous methanol solution, from which carbon dioxide gas has been removed, is fed to the supply passage 89 through a pump 94. Accordingly, the unreacted part of the aqueous methanol solution is recycled to the fuel cell 110, making it possible to efficiently use the aqueous methanol solution.

In this embodiment, the aqueous methanol solution flow-adjusting plate 150 is composed of the porous conductive material, and the mixed solution of methanol and water is introduced into the first passage 160 which is formed on the flat surface side of the aqueous methanol solution flow-adjusting plate 150. Accordingly, the mixed solution permeates through the aqueous methanol solution flow-adjusting plate 150, and it is supplied to the entire operating surface of the anode 116 substantially simultaneously. Therefore, the aqueous methanol solution can be stably supplied at a uniform concentration without any variation in concentration, to the entire operating surface of the anode, as compared with the conventional fuel cell in which the aqueous methanol solution is allowed to flow along a passage formed between the anode 116 and the aqueous methanol solution flow-adjusting plate 150. Accordingly, the aqueous methanol solution can be reliably supplied in a proper amount to the entire anode 116 by using the simple system. Thus, an effect is obtained in that the power generation performance of the entire fuel cell 110 is effectively improved.

First and second concentration sensors 95, 96 for detecting the concentration of the aqueous methanol solution are arranged on a downstream side of the supply passage 89 and on a lower end side of the aqueous methanol solution-storing tank 90 respectively. Accordingly, an advantage is obtained in that the aqueous methanol solution can be always supplied reliably to the fuel cell 110 at an optimum concentration.

The passages 150a, which extend in parallel in the direction of gravity, are formed on the aqueous methanol solution flow-adjusting plate 150 on the side of the surface to contact with the anode 116. Therefore, carbon dioxide gas produced on the anode 116 can be smoothly discharged upwardly, and no carbon dioxide gas remains in the vicinity of the anode 116.

In the direct methanol type fuel cell according to the present invention, the aqueous methanol solution is directly supplied along the aqueous methanol solution-supplying fluid passage formed in parallel to the direction of gravity on the anode-side elemental member, while the oxygen containing gas is supplied along the oxygen containing gas supplying fluid passage formed on the cathode-side elemental member and directed to the direction opposite to the direction to which the aqueous methanol solution-supplying fluid passage is directed. Accordingly, the aqueous methanol solution as the fuel and the oxygen containing gas flow in the opposite directions in the fuel cell unit. Thus, the ununiform temperature distribution over the entire fuel cell unit can be minimized as less as possible. Therefore, the output voltage of the fuel cell unit can be stabilized by using the simple system.

In the direct methanol type fuel cell according to the present invention, when the mixed solution of methanol and water is introduced into the passage provided on the back surface side of the anode-side elemental member formed of the porous conductive material, the mixed solution permeates through the anode-side elemental member, and it is supplied to the anode. Accordingly, the aqueous methanol solution can be stably supplied at a uniform concentration to the entire operating surface of the anode. Thus, the aqueous methanol solution can be reliably supplied in a proper amount to the entire anode. Accordingly, the power generation performance of the fuel cell is effectively improved.

What is claimed is:

1. A direct methanol type fuel cell comprising:
   at least one fuel cell unit including an anode and a cathode provided opposingly with an ion exchange membrane interposed therebetween; and
   a plurality of separators for interposing said fuel cell unit therebetween;
   each of said separators comprising:
   a main separator body;
   an anode-side elemental member including a methanol-supplying fluid passage formed on its surface which contacts with said anode, for allowing methanol to directly flow therethrough, said methanol-supplying fluid passage being formed in parallel to a direction of gravity; and
   a cathode-side elemental member including an oxygen containing gas supplying fluid passage formed on its surface which contacts with said cathode, said oxygen containing gas supplying fluid passage being directed to a direction opposite to a direction to which said methanol-supplying fluid passage is directed.

2. The direct methanol type fuel cell according to claim 1, wherein said methanol-supplying fluid passage is arranged such that said methanol is allowed to flow directly in a direction opposite to gravity.

3. The direct methanol type fuel cell according to claim 1, wherein said oxygen containing gas supplying fluid passage is formed in parallel to said methanol-supplying fluid passage so that oxygen containing gas is allowed to flow along said direction of gravity.

4. The direct methanol type fuel cell according to claim 1, wherein said oxygen containing gas supplying fluid passage has a labyrinth structure.

5. The direct methanol type fuel cell according to claim 1, wherein said main separator body is composed of a conductive dense material.

6. The direct methanol type fuel cell according to claim 1, wherein said main separator body has an opening, a cooling water flow-adjusting plate is fitted to said opening, and grooves formed on said cooling water flow-adjusting plate communicate with a cooling water-introducing passage and a cooling water-discharging passage provided in said main separator body.

7. The direct methanol type fuel cell according to claim 1, wherein said anode-side elemental member comprises an aqueous methanol solution flow-adjusting plate, and said aqueous methanol solution flow-adjusting plate has its first surface which is formed to be flat, and its second surface on which a plurality of parallel and vertically extending aqueous methanol solution-supplying grooves are provided.

8. The direct methanol type fuel cell according to claim 1, wherein said cathode-side elemental member comprises an oxygen containing gas flow-adjusting plate, and said oxygen containing gas flow-adjusting plate has its first surface which is formed to be flat, and its second surface on which a plurality of parallel and vertically extending oxygen containing gas supplying grooves are provided.

9. The direct methanol type fuel cell according to claim 1, wherein said anode-side elemental member is fitted to a hole provided through a first manifold plate, and said cathode-side elemental member is fitted to a hole provided through a second manifold plate.

10. The direct methanol type fuel cell according to claim 9, wherein said anode-side elemental member has a thickness which is substantially the same as that of said first manifold plate, and said cathode-side elemental member has a thickness which is substantially the same as that of said second manifold plate.

11. The direct methanol type fuel cell according to claim 6, wherein cooling water supplied to said cooling water flow-adjusting plate is supplied in said direction opposite to gravity.

12. A direct methanol type fuel cell comprising:

at least one fuel cell unit including an anode and a cathode provided opposingly with an ion exchange membrane interposed therebetween; and a plurality of separators for interposing said fuel cell unit therebetween;

each of said separators comprising:

a cathode-side elemental member; and an anode-side elemental member having its first surface which contacts with said anode, and its second surface on which a passage for introducing a mixed solution of methanol and water is formed; wherein said anode-side elemental member is formed of a porous conductive material for supplying said mixed solution introduced into said passage to said anode in accordance with permeation.

13. The direct methanol type fuel cell according to claim 12, wherein said anode-side elemental member is composed of a porous carbon material.

14. The direct methanol type fuel cell according to claim 13, wherein said anode-side elemental member comprises an aqueous methanol solution flow-adjusting plate, and said aqueous methanol solution flow-adjusting plate composed of said porous material has been subjected to a water repellent treatment.

15. The direct methanol type fuel cell according to claim 12, wherein said cathode-side elemental member is composed of a dense material.

16. The direct methanol type fuel cell according to claim 15, wherein said cathode-side elemental member comprises an oxygen containing gas flow-adjusting plate, and said oxygen containing gas flow-adjusting plate is composed of any one of conductive metal, conductive rubber, conductive resin, graphitized carbon, stainless steel, and nickel alloy.

* * * * *